United States Patent
Zhang et al.

(10) Patent No.: US 7,496,229 B2
(45) Date of Patent: Feb. 24, 2009

(54) SYSTEM AND METHOD FOR VISUAL ECHO CANCELLATION IN A PROJECTOR-CAMERA-WHITEBOARD SYSTEM

(75) Inventors: Zhengyou Zhang, Redmond, WA (US); Hanning Zhou, Urbana, IL (US)

(73) Assignee: Microsoft Corp., Redmond, WA (US)

( * ) Notice: Subject to any disclaimer, the term of this patent is extended or adjusted under 35 U.S.C. 154(b) by 986 days.

(21) Appl. No.: 10/780,209

(22) Filed: Feb. 17, 2004

(65) Prior Publication Data

US 2005/0180631 A1     Aug. 18, 2005

(51) Int. Cl.
*G06K 9/34* (2006.01)
(52) U.S. Cl. .................................... 382/176; 382/173
(58) Field of Classification Search ................ 382/312, 382/173, 176; 353/28, 42; 345/156, 1.2, 345/9; 348/E7.093; 707/E17.009
See application file for complete search history.

(56) References Cited

U.S. PATENT DOCUMENTS 6,388,654 B1 * 5/2002 Platzker et al. ............. 345/156
6,802,611 B2 * 10/2004 Chu et al. .................. 353/28

OTHER PUBLICATIONS

Bérard, F., The magic table: Computer-vision based augmentation of a whiteboard for creative meetings, *Proc. Int'l Workshop on Projector-Camera Systems (ProCams)*, Nice, France, Oct. 2003 (ICCV03).

Crowley, J. L., J. Coutaz, and F. Bérard, Things that see, *Communications of the ACM*, 2000, vol. 43, pp. 54-64.

He, L., Z. Liu, and Z. Zhang, Why take notes? Use the whiteboard capture system, *Proc. Int'l Conf. on Acoustics, Speech, and Signal Processing (ICASSP'03)*, Apr. 2003, Hong Kong, vol. V, pp. 776-779.

Raskar, R, P. Beardsley, A self correcting projector, *Proc. IEEE Conf. on Comp. Vision and Pattern Recognition*, Dec. 2001, Hawaii, pp. 504-508.

Raskar, R., J. Van Baar, P. Beardsley, T. Willwacher, S. Rap, and C. Forlines, iLamps: Geometrically aware, and self-configuring projectors, *ACM Transactions on Graphics*, Jul. 2003, vol. 22, pp. 809-818.

Saund, E., Bringing the marks on a whiteboard to electronic life, *Proc. of CoBuild'99. Second International Workshop on Cooperative Buildings*, 1999, pp. 69-78.

Sukthankar, R., R. G. Stockton, M. D. Mullin, Self-calibrating camera-assisted presentation interface, *Proc. IEEE Conf. on Comp. Vision and Pattern Recognition*, 2001.

Sukthankar, R., R. G. Stockton, M. D. Mullin, Smarter presentations: Exploiting homography in camera-projector systems, *Proc. of Int'l Cong. On Comp. Vision*, 2001.

(Continued)

*Primary Examiner*—Anh Hong Do
(74) *Attorney, Agent, or Firm*—Lyon & Harr, LLP; Katrina A. Lyon (57) ABSTRACT

A system and method for transmitting a clear image of a whiteboard work surface for remote collaboration. The image is separated into two portions; the projected image of the work surface, and the writing physically added to the whiteboard by participants. This separation allows several benefits. The bandwidth requirements are much lower than video teleconferencing, and the benefits of whiteboard sharing are improved. The visual echo created on a physical whiteboard can be canceled.

26 Claims, 9 Drawing Sheets
(1 of 9 Drawing Sheet(s) Filed in Color)

OTHER PUBLICATIONS

Surati, R., Scalable self-calibrating and display technology for seamless large-scale displays, PhD Thesis, Massachusetts Institute of Technology, 1999.

Van Baar, J., T. Willwacher, S. Rao, and R. Raskar, Seamless multi-projector display on curved screens, *Eurographics Workshop on Virtual Environments*, May 2003, pp. 281-286.

* cited by examiner

SYSTEM AND METHOD FOR VISUAL ECHO CANCELLATION IN A PROJECTOR-CAMERA-WHITEBOARD SYSTEM

BACKGROUND

1. Technical Field

The invention is related to a system that incorporates a whiteboard into a projector-camera system. More particularly, this invention is related to a system and method for transmitting a clear image of a whiteboard work surface for remote collaboration by employing a visual echo cancellation technique.

2. Related Art

During the past few years one has witnessed the transformation of video cameras and projectors from expensive lab equipments to affordable consumer products. This has triggered the creation of many human-computer interaction systems that incorporate both the large-scale display provided by the projector and intelligent feedback from one or more cameras. On the other hand, the whiteboard is still an indispensable part of many meetings (including lecturing, presentations and brainstorming), because it provides a large shared space for meeting participants to focus their attention and express and exchange their ideas spontaneously.

Previous works have integrated whiteboards within a projector-camera system. However, these previous works mostly focused on group collaboration at the same physical location. The use of a whiteboard where there are remote participants, on the other hand, poses a variety of problems. For example, remote meeting participants cannot contribute to the content written on a whiteboard because they are not physically in the same place as the whiteboard. Additionally, sending images of the whiteboard to remote participants via a network use a great amount of network bandwidth and is often quite slow.

Therefore, what is needed is a system and method for capturing and transmitting the contents of writing on a whiteboard that can be transferred to remote meeting participants via a network in a legible manner without requiring a large bandwidth. The system should also allow remote participants to contribute to the whiteboard content and allow for the whiteboard content to be archived for viewing at a later date.

SUMMARY

The system and method of the present invention integrates a whiteboard into a projector-camera system by using the whiteboard both as a writing surface and a projecting surface. The invention captures an image sequence or video of the whiteboard with a camera and separates the writing on the whiteboard from the contents projected on it.

By adding the extracted writings digitally on the original computer presentation for display at remote sites, remote attendees can have a better viewing experience than just viewing the transmitted display content where the writing on the whiteboard is not available. They also have a better viewing experience than just viewing the raw whiteboard video in which the quality of the original display content is poor. Furthermore, if remote attendees send an annotation to the local meeting room, the annotation will be projected, but it will not be sent back to the remote site. By analogy with echo cancellation in audio conferencing, this is called visual echo cancellation. Visual echo, by strict definition, is the appearance of the projected annotation (from remote attendees) viewed by the camera. However, since the computer presentation is sent to remote attendees for better viewing quality, one must also consider the appearance of the projected presentation as visual echo. Visual echo cancellation is then solved if one can extract only the physical writings from the video or sequence of images of the items projected on the whiteboard. For this, one needs an accurate prediction of the appearance of the computer-projected content viewed by the camera. This, in turn, requires two basic components: geometric calibration and color calibration. Geometric calibration concerns the mapping between the position in the camera view and the position in the projector screen, namely the whiteboard in this case. Color calibration concerns the mapping between the actual color of the projected content and that seen by the camera.

A typical process by which the system and method according to the invention can be employed is as follows. Initially, geometric calibration data and color calibration data are obtained. Images or video of the whiteboard having projected items thereon, such as for example, a projected presentation or annotations made by remote participants, as well as writings written on the physical whiteboard are captured. Then, the visual echo for a given captured image is computed. Visual echo cancellation is then used to isolate the writings written on the whiteboard from the projected content (e.g., the remote participant's annotations and the electronic presentation). The writings may be sent to the remote participants to be displayed at a remote display in conjunction with the transmitted presentation and the annotations made by the remote participants. Similarly, the writings may be archived for future viewing.

Several immediate advantages of the system and method according to the invention are that computer presentations and whiteboard discussions are seamlessly integrated into one session. Meeting attendees are not distracted by switching their attention from a projector screen to the whiteboard, and vice versa. Furthermore, such a system enables local and remote attendees to collaborate with each other on a single mutually shared workspace. Local attendees have a much more natural writing surface than if a commercial large display product, such as an electronic whiteboard, is used. Most importantly, the system can be easily deployed on top of current meeting environments. The system and method of the present invention is therefore much more economical than most large display products that require installing specialized and usually expensive equipments and accessories.

In addition to the just described benefits, other advantages of the present invention will become apparent from the detailed description which follows hereinafter when taken in conjunction with the accompanying drawing figures.

DESCRIPTION OF THE DRAWINGS

The file of this patent contains at least one drawing executed in color. Copies of this patent or patent application publication with color drawing(s) will be provided by the U.S. Patent and Trademark Office upon request and payment of the necessary fee.

The specific features, aspects, and advantages of the present invention will become better understood with regard to the following description, appended claims, and accompanying drawings where:

DETAILED DESCRIPTION OF THE PREFERRED EMBODIMENTS

In the following description of the preferred embodiments of the present invention, reference is made to the accompanying drawings, which form a part hereof, and in which is shown by way of illustration specific embodiments in which the invention may be practiced. It is understood that other embodiments may be utilized and structural changes may be made without departing from the scope of the present invention.

Figure 1:
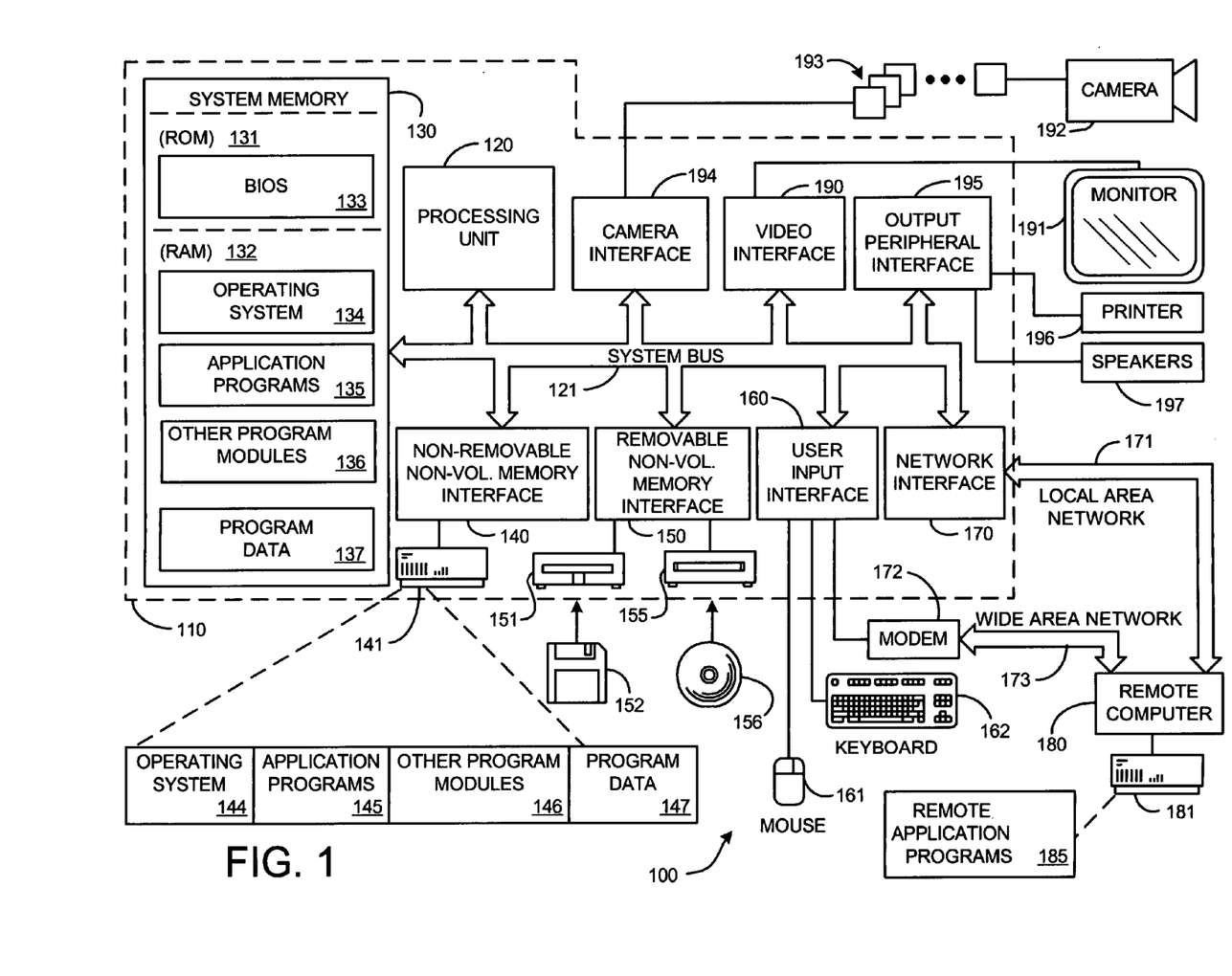
FIG. 1 is a general system diagram depicting a general-purpose computing device constituting an exemplary system for implementing the present invention.

1.0 Exemplary Operating Environment:

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held, laptop or mobile computer or communications devices such as cell phones and PDA's, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices. With reference to FIG. 1, an exemplary system for implementing the invention includes a general-purpose computing device in the form of a computer 110.

Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes volatile and nonvolatile removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

Further, the computer 110 may also include, as an input device, a camera 192 (such as a digital/electronic still or video camera, or film/photographic scanner) capable of capturing a sequence of images 193. Further, while just one camera 192 is depicted, multiple cameras could be included as input devices to the computer 110. The use of multiple cameras provides the capability to capture multiple views of an image simultaneously or sequentially, to capture three-dimensional or depth images, or to capture panoramic images of a scene. The images 193 from the one or more cameras 192 are input into the computer 110 via an appropriate camera interface 194. This interface is connected to the system bus 121, thereby allowing the images 193 to be routed to and stored in the RAM 132, or any of the other aforementioned data storage devices associated with the computer 110. However, it is noted that image data can be input into the computer 110 from any of the aforementioned computer-readable media as well, without requiring the use of a camera 192.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

The exemplary operating environment having now been discussed, the remaining part of this description will be devoted to a discussion of the program modules and processes embodying the present invention.

2.0 A System and Method for Visual Echo Cancellation in a Projector-Camera-Whiteboard System.

The system and method of the invention integrates a whiteboard into a projector-camera system by using the whiteboard both as a writing surface and a projecting surface. The invention captures video or a sequence of images of a whiteboard and separates writing on the whiteboard from the projected image. It is very beneficial to be able to separate whiteboard writings from the projected contents for a variety of reasons. For example, it dramatically reduces the bandwidth requirement for teleconferencing, because both extracted writing and the computer-projected contents can be transmitted with very low bandwidth, compared to the original mixed video which is affected by shadows and lighting variations. Additionally, extracted writings are essential for archiving and browsing meetings offline. Writing on the whiteboard usually indicates an important event in a meeting. By feeding the results to an optical character recognition (OCR) system, the meeting archive can be more easily accessed and transferred into other forms.

2.1 System Overview.

Figure 2:
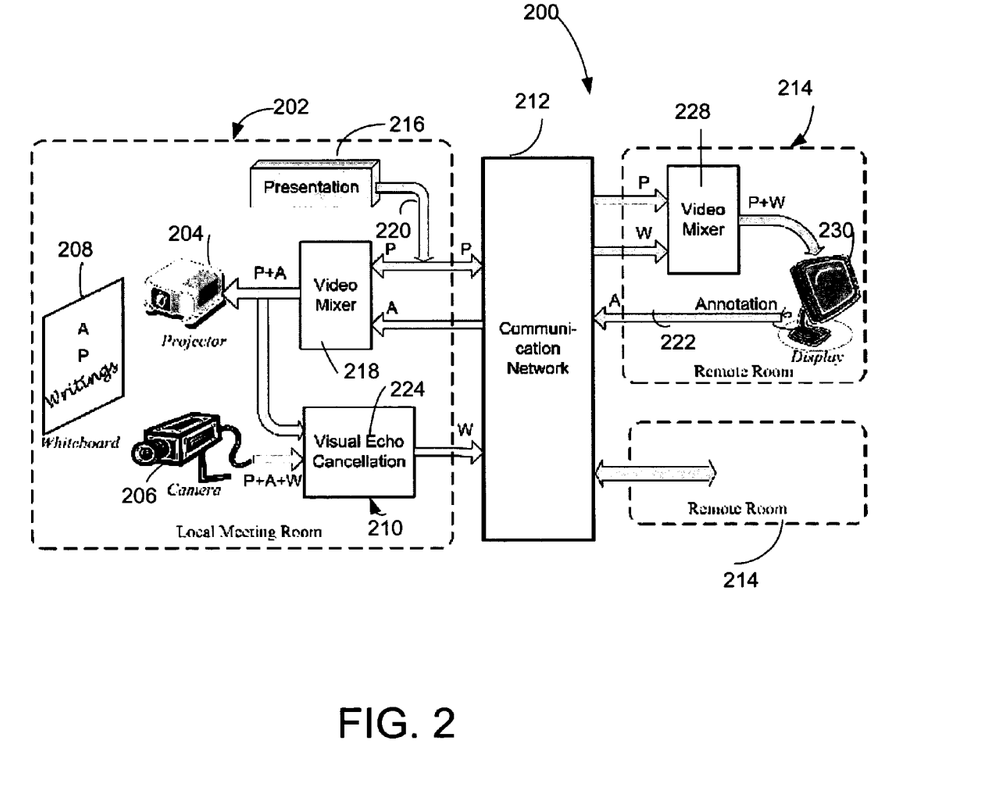
FIG. 2 illustrates a projector-camera-whiteboard system according to the present invention.

FIG. 2 illustrates one embodiment of the projector-camera-whiteboard system 200 of the present invention. A local meeting room 202 is equipped with a projector 204, a camera 206, and a whiteboard 208. The projector 204 and the camera 206 are preferably rigidly attached to each other, although theoretically they can be positioned anywhere as long as the projector projects on the whiteboard 208 and the camera sees the whole projection area (referred to as the projector space). The projector 204 and the camera 206 are linked (wirelessly or not) to a computer 210, and the computer is connected to the communication network (e.g., intranet or internet) 212. Remote attendees 214 also connect their computers to the communication network 212. Data transmission between the computer in the meeting room and remote computers is preferably conducted through real-time transport protocol (RTP).

An electronic presentation 216 is projected on the whiteboard 208 via a video mixer 218 and the projector 204 and is also sent to the remote participants 214 via the network 212 for display at the remote participants. A presentation 216 can, for example, be presentation slides, a spreadsheet, a PDF file, and so on, anything that would typically presented in a meeting, lecture, or brainstorming session. The data stream for the presentation 220 is indicated by "P" in FIG. 2. Remote attendees 214 may annotate the presentation, and the annotation stream 222 is indicated by "A". Both the presentation data stream "P" 220 and the annotation data stream "A" 222 are mixed together via the video mixer 218 before sending them to the projector 204 to project them on the whiteboard 208. During the presentation, the presenter or other local attendees may write or draw on the whiteboard. The camera 206 captures both the projected content and the writings. Through geometric and color calibrations, the system predicts the appearance of the projected "P" and "A" data streams viewed by the camera, i.e., a visual echo. A Visual Echo Cancellation module 224 in the computer 210 extracts only the writings on the whiteboard 226, indicated by "W", by subtracting the predicted visual echo from the live video/images captured by the camera. At the remote side, the presentation data stream "P" 220 and the whiteboard writing stream "W" 226 are mixed via a mixer 228 before displaying on the remote participant's computer display 230.

Figure 3:
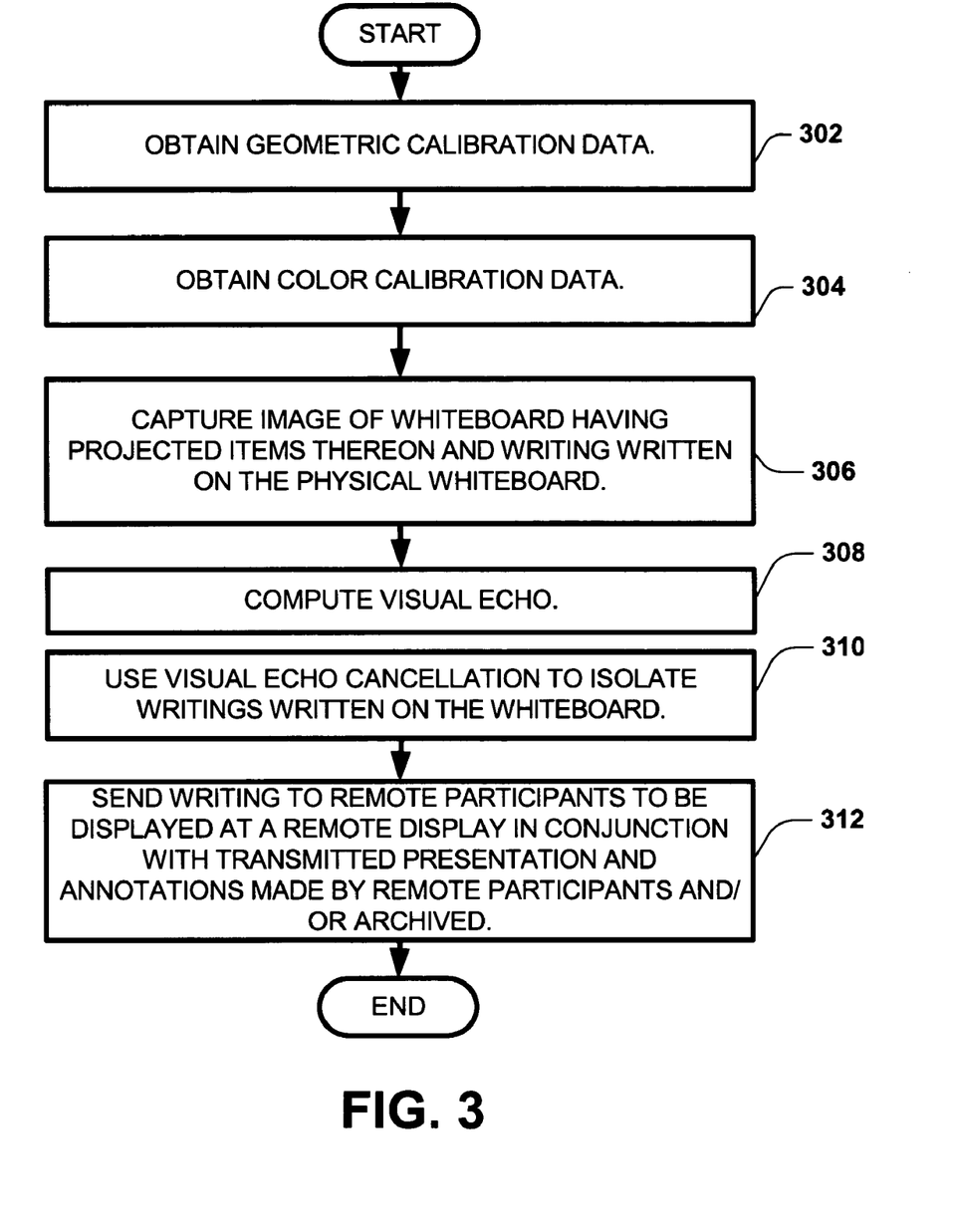
FIG. 3 illustrates an exemplary flow diagram for the general process of separating projected content and whiteboard writings according to the present invention.

A typical process by which the system and method according to the invention could be employed is shown in FIG. 3. As shown in FIG. 3, process action 302, geometric calibration data is obtained. Similarly, color calibration data is obtained, as shown in process action 304. Images or video of the whiteboard having projected items thereon, such as for example, a projected presentation and/or annotations made by remote participants, as well as writings written on the physical whiteboard are captured, as shown in process action 306. Then, as shown in process action 308, a visual echo of a captured image is computed. Visual echo cancellation is then used to isolate the writings written on the whiteboard from the projected content (e.g., the remote participant's annotations and the electronic presentation) as shown in process action 310. The writings may be sent to the remote participants to be displayed at a remote display in conjunction with the transmitted presentation and the annotations made by the remote participants. Likewise, the writings may be archived for future viewing (process action 312).

Various details of the system and process discussed above are provided in the paragraphs below.

2.2 Geometric Calibration.

For visual echo cancellation, one needs to know the relationship between the position in the camera view and the position in the projector screen. This is the task of geometric calibration. Assuming that both camera and projector are linear projective and that the whiteboard surface is planar, it can be easily shown that the mapping between a point in the camera view and a point in the projector screen/whiteboard is a homography, and can be described by a 3×3 matrix H defined up to a scale factor.

For geometric calibration, it is assumed that both the camera and the projector are linear projective, and a robust, accurate and simple technique is implemented by leveraging the fact that the projector can actively project desired patterns.

Figure 4:
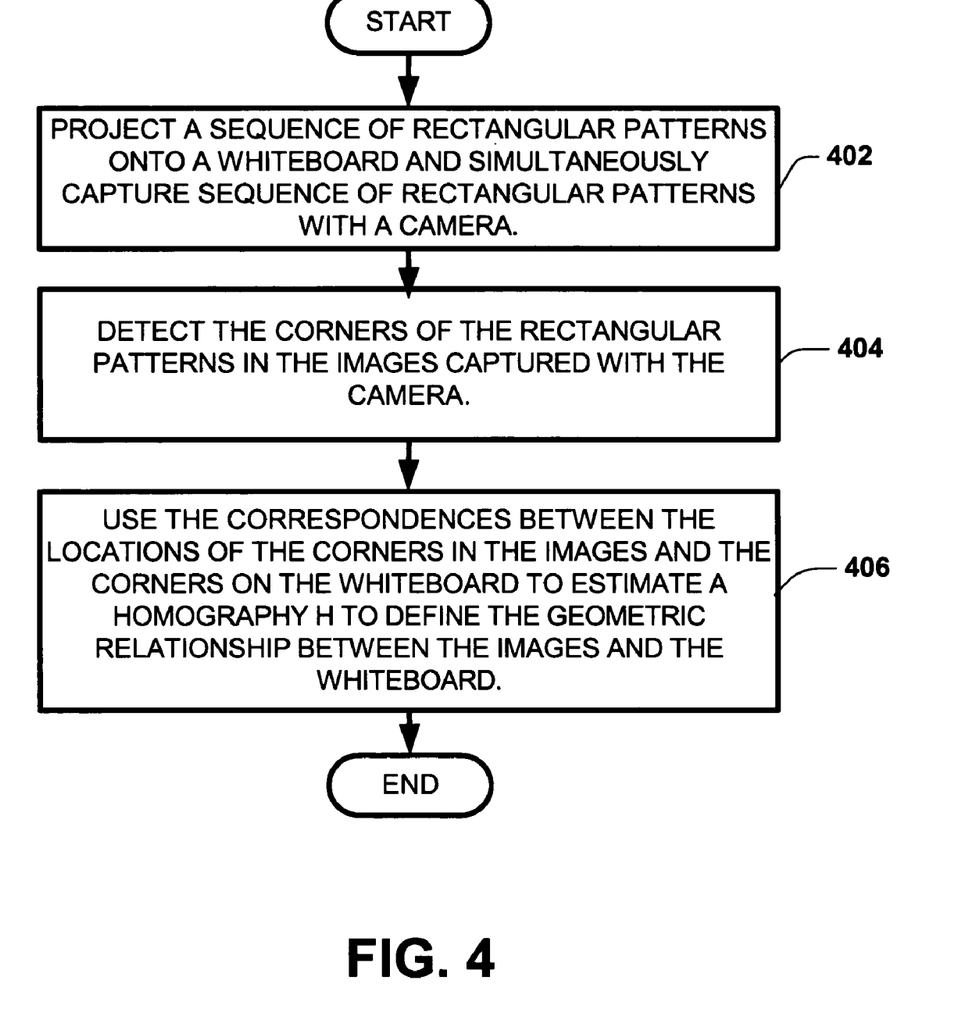
FIG. 4 illustrates a flow diagram for the geometric calibration process according to the present invention.

FIG. 4 shows a simplified flowchart for the geometric calibration process employed by the system and method according to the invention. In one working embodiment the whole geometric calibration process takes less than two minutes and is only necessary when camera is moved with respect to the projector. As shown in FIG. 4, process action 402, initially N rectangles are sequentially projected onto the whiteboard and their images are simultaneously captured using a fixed camera. In one working embodiment of the invention N=40 was used. Next, as shown in process action 404, the four corners of each of the rectangles are detected in the images, as discussed in the paragraph below. Then, the 4×N detected corners and their corresponding known positions in the projector space are used to estimate the homography between the projector screen/whiteboard and the image plane of the camera (process action 406). The projector space can be viewed as the virtual plane of the computer display screen. Since one can control where to display the rectangular on the computer screen, the positions of the corners in the projector space are known. It should be noted that in theory, only four points (i.e., one rectangle) are necessary to estimate the homography. In order to achieve higher accuracy, the system and method of the invention uses a greater number of rectangles that are projected at different locations of the whiteboard. Compared to other geometric calibration methods, the system and method according to the invention takes advantage of the fact that the relative position between the camera and the projection surface is fixed during the calibration. Therefore, correspondences detected in different images can be used for estimating a single homography, which increase the accuracy and robustness of the system and method without complicating the corner detection algorithm.

2.2.1. Corner Detection for Geometric Calibration.

Figure 5:
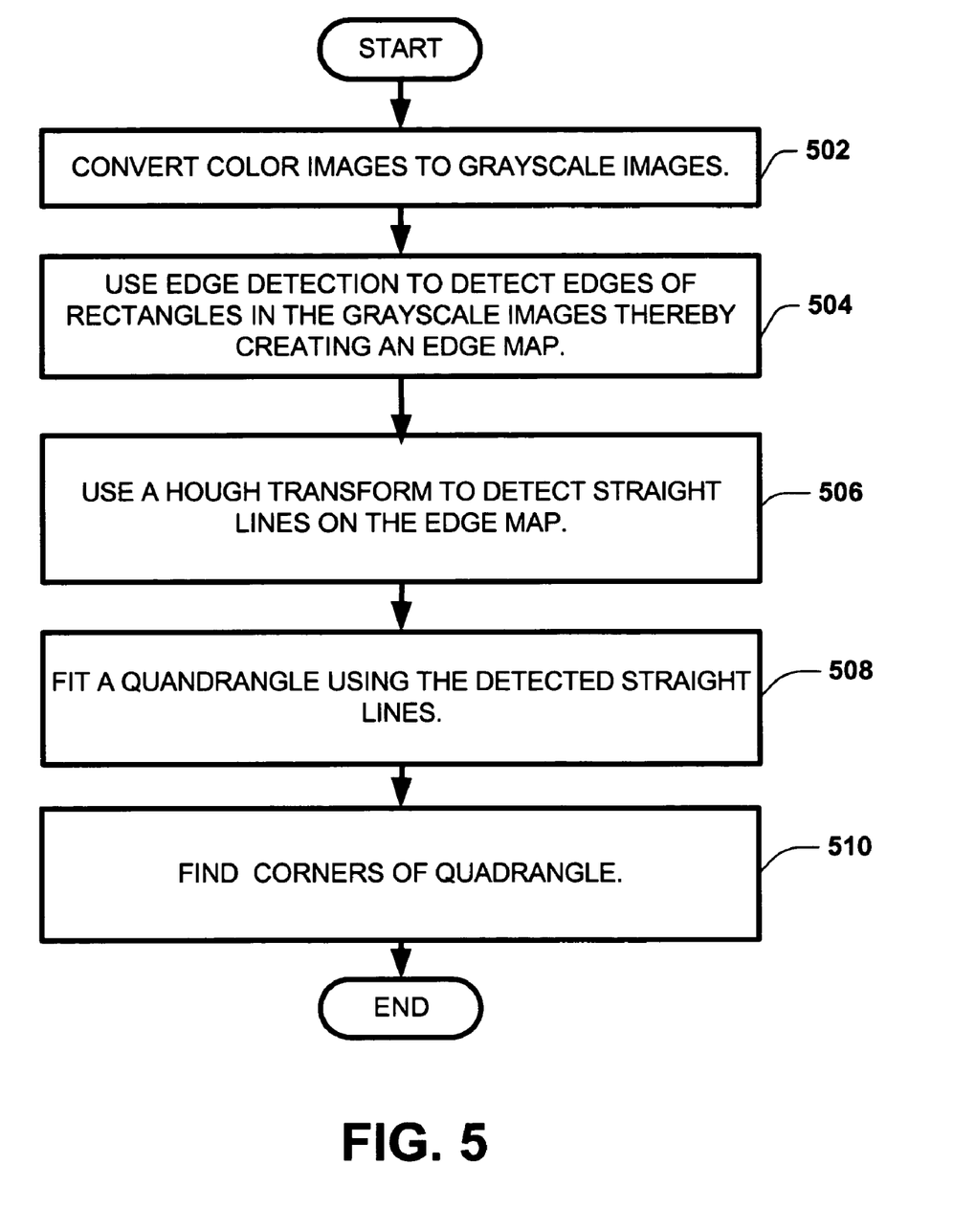
FIG. 5 illustrates a flow diagram for the corner detection process employed by the system and method according to the present invention.

One process that can be used for corner detection is shown in FIG. 5. The corner detection process begins by converting the color images to gray scale images, as shown in process 502. In order to reduce the noise in edge map and to increase the contrast, one needs to find the region inside and outside the projected rectangle and quantize the grayscale value. Since the inside region is bright and homogeneous, it forms peak p1 at the higher range of the histogram, while the background forms peak p2 at the lower range. A coarse-to-fine histogram-based method is used to find the two peaks and set the higher threshold $$h1 = \frac{3}{4} \times p1 + \frac{1}{4} \times p2$$

and the lower threshold $$h2 = \frac{1}{4} \times p1 + \frac{3}{4} \times p2.$$

The grayscale level of all pixels above h1 are set to h1, while those below h2 are set to h2, and those in between remain unchanged. The edges of the rectangles are then detected in the grayscale image using one of the conventional methods of edge detection to create an edge map (process action 504). A Hough transform is then used to detect straight lines on the edge map (process action 506). A quadrangle is then fit using the lines, as shown in process action 508. The corners of the quadrangle are then found (process action 510).

2.4 Color Calibration.

For visual echo cancellation, for a given pixel in the projector space on the whiteboard, one knows its corresponding position in the camera space through the geometric calibration described above. However, one also needs to know what the corresponding color in projector space should look like in the captured images/video, which is determined by color calibration. The same color in the projector space appears differently in the camera, depending where the color is projected on the whiteboard. This is because the projector light bulb does not produce uniform lighting, the lighting in the room is flickering and not uniform, and the whiteboard surface is not Lambertian. Therefore, color calibration should be both color- and position-dependent.

For color calibration, pixels of the visual echo are modeled as independent Gaussian random variables and a lookup-table-based approach is used. Note that both geometric calibration and color calibration should also be useful for other tasks than visual echo cancellation, such as automatic keystone correction for projectors.

Figure 6:
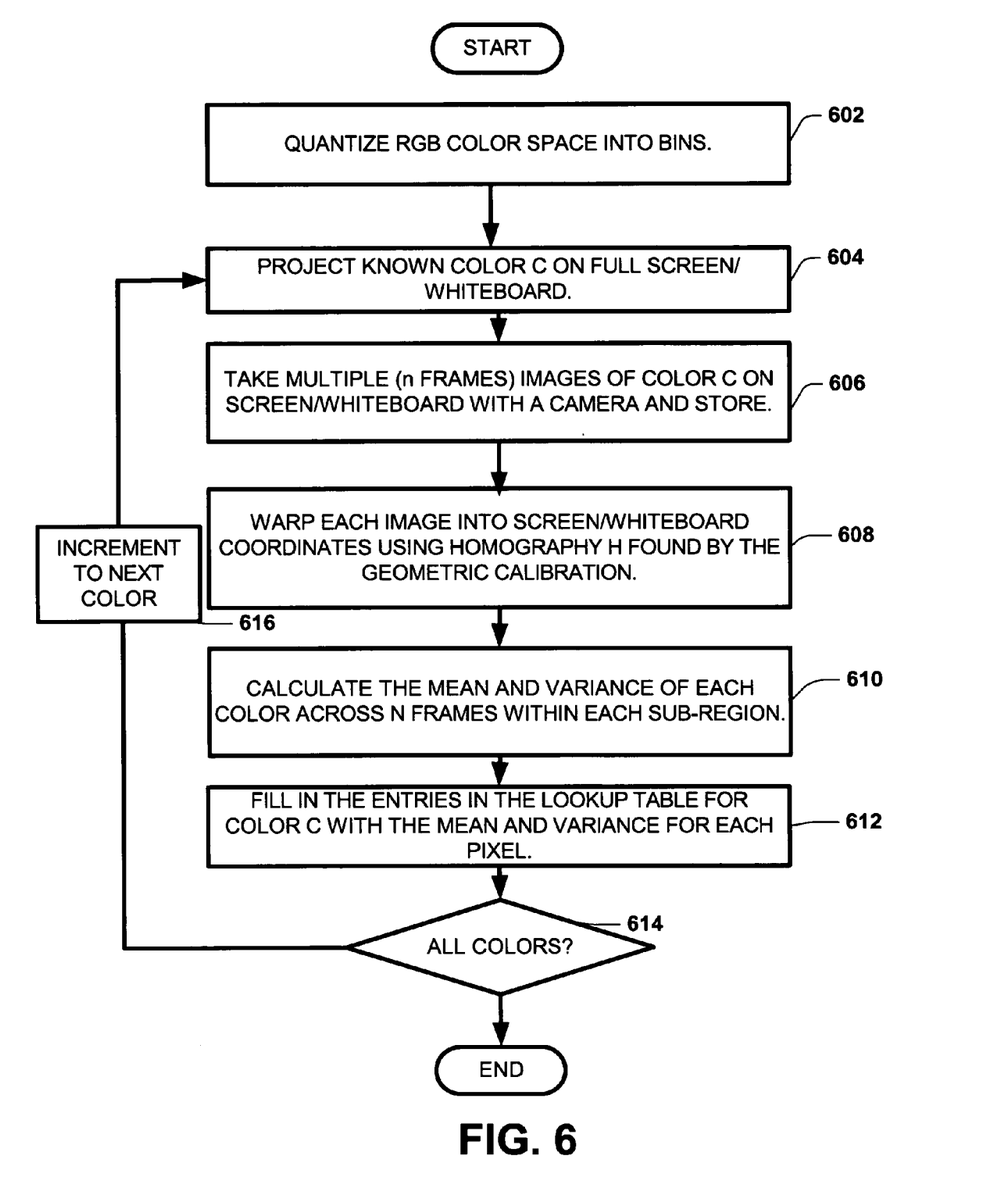
FIG. 6 illustrates a flow diagram for the color calibration process employed by the system and method according to the present invention.

FIG. 6 shows the flowchart for color calibration. As shown in FIG. 6, process action 602, this process begins by quantizing the RGB color space into bins. In one working embodiment of the invention 9×9×9 or 729 bins were used. In process action 604, each quantized color is projected over the whole display region and its image is captured in synchronization, storing n frames for each color (process action 606). In one working embodiment 5 frames were stored for each color. In process action 608, each image is warped to the projected screen coordinates using the homography H found in the geometric calibration. The display region is divided evenly into rectangular blocks (e.g., 32×32 or 1024) and the mean and variance of each color in each block is calculated across the n frames, as shown in process 610. The mean and variance values are entered into a lookup table for color C (process action 612) and the next color is projected until all quantized colors have been projected (process action 614 and 616).

Using the process of FIG. 6, a lookup table is built for the quantized colors (e.g. 729) at each of the blocks (e.g. 1024 blocks). Note that the spatial dimensionality is necessary because the same projected color will have a different appearance at different positions on the screen/whiteboard. The best result would be obtained if a lookup table were built for every pixel position, but this seems unnecessary based on experimental data because the color appearance changes smoothly across the display surface.

Usually it is sufficient to perform the color calibration procedure once. However, it may be necessary to perform the color calibration procedure again if certain settings for the projector (color temperature, contrast or brightness) or the camera (exposure or white balance) are changed. Projecting and capturing 729×n (=3645 when n=5) frames at 10 fps (to ensure projecting and capturing are synchronized) takes about 6 minutes in one embodiment of the invention.

2.5. Visual Echo Cancellation.

The following paragraphs describe the visual echo estimation and cancellation procedures.

2.5.1 Visual Echo Estimation.

Figure 7:
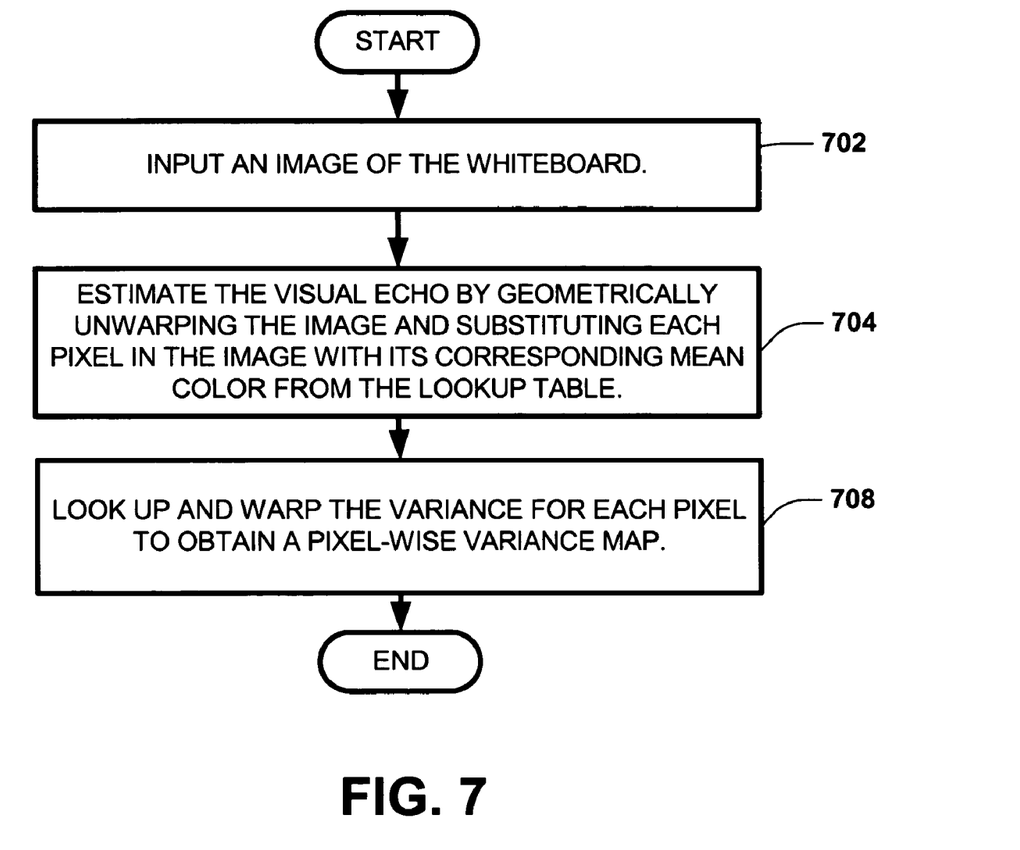
FIG. 7 illustrates a flow diagram for estimating visual echoes employed by the system and method according to the present invention.

Given arbitrary display content of a captured image (process action 702), the system and method of the invention estimates the visual echo E, as shown in FIG. 7, by initially substituting each pixel with its correspondent mean color in the lookup table defined in the color calibration procedure (process action 704). For colors not in the table, linear interpolation of the two nearest bins is used. Then, as shown in process action 706, each pixel in the image is warped to the camera view. To obtain an estimate of the error bound for each pixel, one also looks up and warps the variances to get a pixel-wise variance map V (process action 708).

2.5. Visual Echo Cancellation

Figure 8:
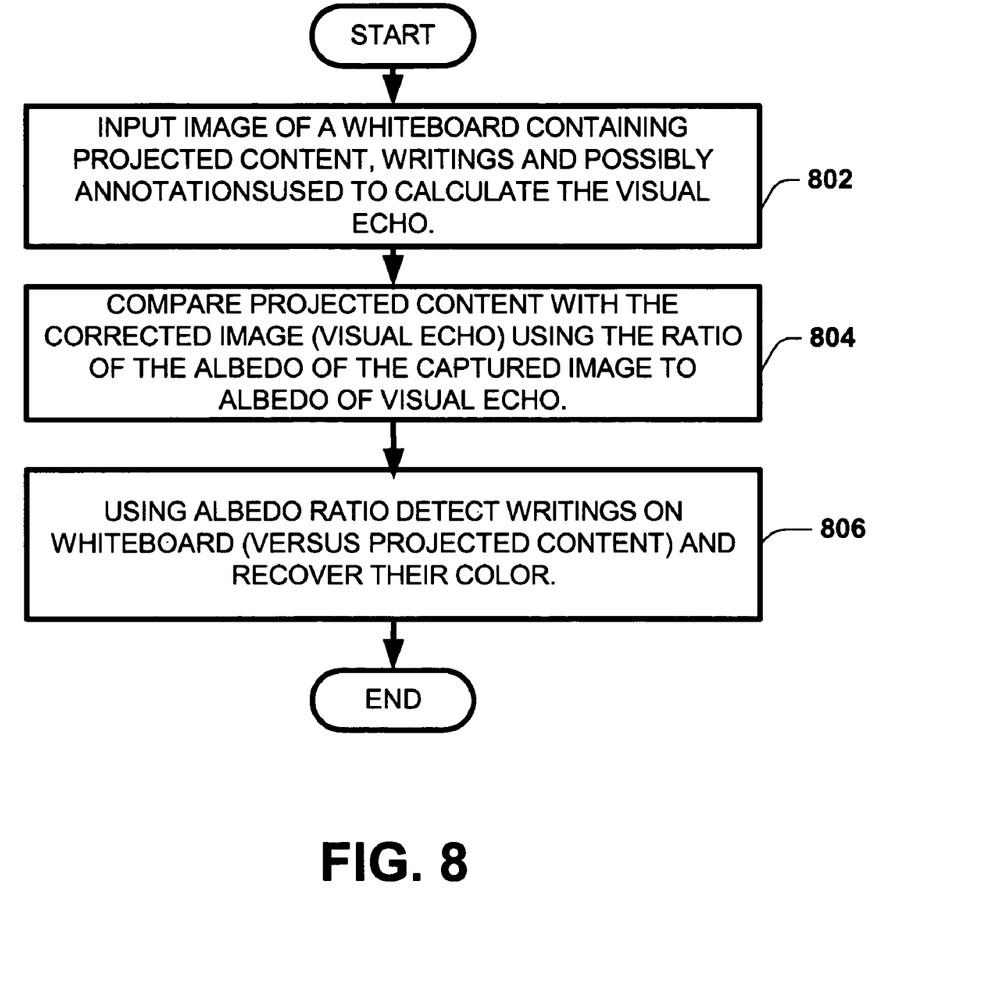
FIG. 8 illustrates a flow diagram for canceling visual echoes employed by the system and method according to the present invention.

FIG. 8 shows a flowchart of the general visual echo cancellation process according to the present invention. The details are explained in the following subsections. As shown in FIG. 8, process action 802, an image of the whiteboard containing the projected content such as a presentation and any annotations, as well as possible whiteboard writings for which the visual echo was calculated is input into the system. The projected content (e.g., projected presentation and annotations) of the image is compared with the corrected image (visual echo) using the ratio of the albedo of the captured image to the albedo of the visual echo, as shown in process action 804. Using the albedo ratio, the writings on the whiteboard (vice the projected content) are identified and their color is recovered, as shown in process action 806.

2.5.1. Generative Process of The Captured Image.

By writing/drawing with a marker on a whiteboard, one actually changes the surface albedo of the whiteboard, and therefore changes the reflection. Therefore, in a general sense, extracting the writings on the whiteboard boils down to detecting the changes of the surface albedo.

Assuming all the images are geometrically aligned, and denoting the incident light map by P, the surface albedo of the whiteboard by A, the pixel-wise color transformation due the camera sensor by C, and the visual echo by E, one has E=C×A×P. If nothing is written on the whiteboard, then the captured image I should be equal to E. If there is anything written on the whiteboard, the surface albedo changes, and is denoted by Ã. The captured image can then be described by I=C×Ã×P. One can compute the albedo change by estimating the albedo ratio $a=\tilde{A}/A$ of the pixel [x,y] in color channel $c \in \{R,G,B\}$, which is given by $$a_{[x,y],c} = \frac{I_{[x,y],c}}{E_{[x,y],c}} \quad (1)$$

Note that writings on the whiteboard absorb the light, so $\tilde{A} \leq A$, and in consequence $a_{[x,y],c} \leq 1$.

Based on the albedo ratio a, one can detect the writings and recover their color. The albedo for the whiteboard region without writings should be 1. Assuming the sensor noise on the albedo is additive and has a zero-mean Gaussian distribution with variance $$\frac{V}{E},$$

the following decision rule results:

Pixel [x,y] belongs to the written region if and only if $$1 - \frac{a_{[x,y],R} + a_{[x,y],G} + a_{[x,y],B}}{3} > \frac{V_{[x,y],R} + V_{[x,y],G} + V_{[x,y],B}}{E_{[x,y],R} + E_{[x,y],G} + E_{[x,y],B}} \quad (2)$$

Note that the decision rule is one-sided, because, as mentioned earlier, the albedo ratio for written whiteboard region is strictly less than 1.

For each pixel [x,y] that belongs to the written region, one can recover the writings with its colors as $$W_{[x,y],c} = a_{[x,y],c} \times 255 \quad (3)$$

assuming the color intensity ranges from 0 to 255.

2.5.2. Practical Considerations.

Due to the noise in geometric calibration, I and E are not exactly aligned. The 1 to 2 pixel errors are most evident near strong edges in E. Therefore, in written region segmentation, one first applies an erosion on E which increases the dark region. Erosion is a standard image morphological operation. In a binary image, it will assign a 0 (black) value to pixels with a certain neighborhood pattern. It is extended to grayscale and color images. The system and method of the invention use its extension in a color image. Thus, the pixels near the dark regions in E have higher A and are less likely be classified as written region. This preprocessing reduces error because in order to make the writings more visible, most users prefer to write on top of brighter background instead of darker background.

In practice, to make the colors in W visible, one needs to set the camera exposure to be much higher than normality. This will cause over-exposure during color calibration. The system and method of the invention addresses this problem by setting the exposure optimal for color calibration, and using a classification method to recover the colors of the writings. The four most commonly used markers (red, black, blue and green) are chosen as classes $M_o\sim M_3$. For supervised training, one uses Equations (2) and (3) to recover a set of writings W, and then converts it from RGB color space to HSI (hue, saturation and intensity) color space, and denotes the new image as W'. The training data for class $M_i$ is labeled by manually by selecting the region of written by Marker i, and collecting its histogram $n_i(h,s,i)$.

To classify a pixel $W_{[x,y]}$ obtained from Equation (3), its RGB value is converted to $W'_{[x,y]}$ in HSI space and evaluate the likelihood that it belongs Cluster i as $$p([x, y] | M_i) = \frac{n_i(W'_{[x,y]h}, W'_{[x,y]s}, W'_{[x,y]i})}{N_i}, \text{ for } i = 0, \ldots 3, \quad (4)$$

where $N_i$ is the total number of data points in Histogram i.

Due to noise in camera sensor, a MAP decision rule may not give spatially consistent results, so a 61×61 window is used to the collect votes from all the pixels in the neighborhood and to classify the center pixel based on the maximum votes.

3.0 Experimental Results.

The geometric calibration method was used using various projectors (including an InFocus LP530 and a Proxima DP6155) and various video cameras (including a Aplex USB2, a Logitech Pro4000 and a SONY EVI30), under both artificial lighting and natural lighting conditions. The fitting error for solving the homography based on correspondences ranges from 0.3 to 0.7 pixels.

For color calibration, a SONY projector and EVI30 camera were used. Comparing the estimated visual echo E with the actual captured image I, the average error is around 3 (color intensity range 0~255). The majority of the discrepancy is around the regions with strong edges, due to the noise in geometric calibration.

Figure 9:
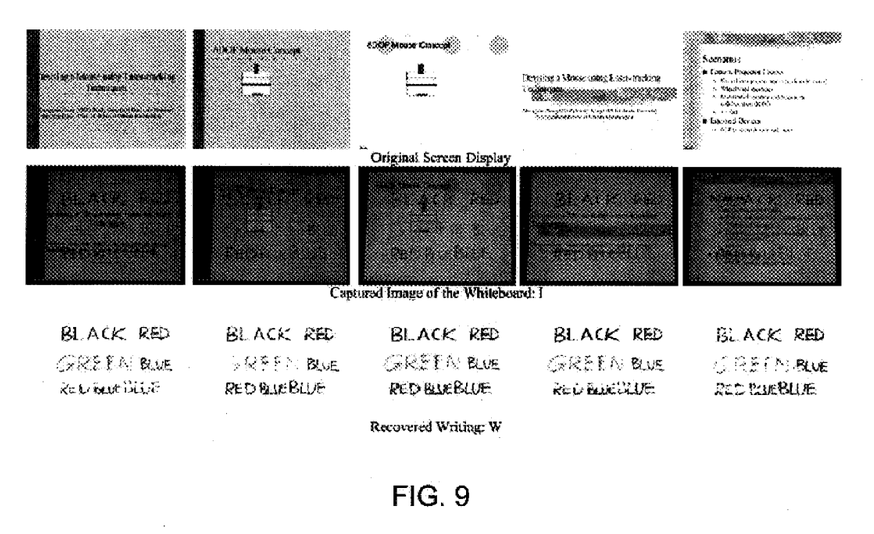
FIG. 9 illustrates experimental results obtain by using the visual echo cancellation system and method according to the present invention.

FIG. 9 shows the visual echo cancellation results on various backgrounds. One can see that majority of the writings are recovered except for the parts on top of extremely complex backgrounds. In this case, however, it is even difficult for the human eye to discern the writings.

The foregoing description of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer-implemented process for segmenting writings written on a whiteboard work surface, comprising the process actions of:

capturing images of a whiteboard that includes one or more items projected on the whiteboard and writings written on the whiteboard with a camera;

separating into two files the one or more items projected on the whiteboard and the writings written on the whiteboard, wherein separating into two files the one or more items projected on the whiteboard and the writings written on the whiteboard comprises the process actions of:

determining a relationship between a position of the camera view and the one or more items projected on the whiteboard via geometric calibration;

determining a relationship between colors of the writings written on the whiteboard and colors of the writings written on the whiteboard captured in the images via color calibration;

estimating a visual echo image that corrects a captured image to match the whiteboard in geometry and color using the results of the geometric calibration and the color calibration;

using visual echo cancellation to isolate writings written on the whiteboard by comparing a ratio of the albedo of the captured image to the albedo of the visual echo image; and displaying the writings written on the whiteboard on another display.

2. The computer-implemented process of claim 1 further comprising the process action of transmitting the file containing the writings written on the whiteboard to remote participants.

3. The computer-implemented process of claim 1 further comprising the process action of archiving the file containing the writings written on the whiteboard.

4. The computer-implemented process of claim 1 wherein the one or more items projected on the whiteboard comprises an electronic presentation.

5. The computer-implemented process of claim 1 wherein the one or more items projected on the whiteboard comprises annotations received from remote participants.

6. The computer-implemented process of claim 1 wherein the visual echo comprises annotations from remote participant and projected content.

7. The computer-implemented process of claim 1 wherein if the ratio of the albedo of the captured image to the albedo of the visual echo is less than 1, then a given pixel[x,y] belongs to the writings if and only if 1-(albedo ratio for the sum of the red, green and blue color channels)/3 is greater than (the sum of the variances of the pixel for the red, green and blue color channels)/(the sum of the visual echoes for the pixel for the red, green and blue color channels).

8. The computer-implemented process of claim 7 wherein for a pixel [x,y] that belongs to the writings, for a given color channel, the color in the captured image can be corrected by multiplying its albedo ratio for the given channel by 255.

9. A computer-implemented process for identifying content written on a whiteboard comprising the process actions of:

obtaining geometric calibration data determining a geometric relationship between a whiteboard and a view of said whiteboard captured by a camera;

obtaining color calibration data determining a color relationship between the color of writings written on the whiteboard and the color of writings written on a whiteboard in an image captured by said camera;

capturing an image of said whiteboard having projected content and writings written on the whiteboard;

calculating a visual echo of the captured image by correcting the color and geometry of the captured image using the geometric calibration data and the color calibration data;

using a ratio of the albedo of the captured image to the albedo of the visual echo to identify writings on the whiteboard; and displaying the writings on the whiteboard on another display.

10. The computer-implemented process of claim 9 further comprising the process actions of:
   segmenting out the identified writings; and
   transmitting the segmented writings to a remote site for display.

11. The computer-implemented process of claim 9 further comprising the process actions of:
   segmenting out the identified writings; and
   saving the segmented writings for later viewing.

12. The computer-implemented process of claim 9 wherein obtaining geometric calibration data comprises the process actions of:
   projecting a sequence of rectangular patterns onto the whiteboard and simultaneously capturing the sequence of rectangular patterns in a sequence of images;
   detecting the corners of the rectangular patterns in the sequence of images captured with the camera; and
   using the correspondences between the locations of the corners in the sequence of images and the corners of the rectangular patterns on the whiteboard to estimate a homography that defines the geometric relationship between the camera view and the whiteboard.

13. The computer-implemented process of claim 12 wherein detecting the corners comprises the process actions of:
   converting the images to grayscale images;
   using edge detection to detect edges of the rectangles in the grayscale images thereby creating an edge map;
   using a Hough transform to detect straight lines on the edge map;
   fitting a quadrangle for each of the rectangles using the detected straight lines; and
   finding the corners of the quadrangle.

14. The computer-implemented process of claim 9 wherein obtaining the color calibration data comprises the process actions of:
   quantizing red, green, blue color space into bins;
   for each of the set of quantized colors,
      projecting a known color onto the full whiteboard that is divided into sub-regions;
      taking n images of said known color projected on the whiteboard with a camera and storing said n images;
      warping each of said n images into whiteboard coordinates using the homography found by the geometric calibration;
      calculating the mean and variance of each color across n frames for each sub-region; and
      creating a lookup table of the mean and variance of each sub-region for said known color.

15. The computer-implemented process of claim 9 wherein if the ratio of the albedo of the captured image to the albedo of the visual echo is equal to 1, then nothing is written on the whiteboard.

16. The computer-implemented process of claim 9 wherein if the ratio of the albedo of the captured image to the albedo of the visual echo is less than 1, then there are writings written on the whiteboard.

17. The computer-implemented process of claim 9 wherein if the ratio of the albedo of the captured image to the albedo of the visual echo is less than 1, then a given pixel[x,y] belongs to the writings if and only if 1-(albedo ratio for the sum of the red, green and blue color channels)/3 is greater than (the sum of the variances of the pixel for the red, green and blue color channels)/(the sum of the visual echoes for the pixel for the red, green and blue color channels).

18. The computer-implemented process of claim 17 wherein for a pixel [x,y] that belongs to the writings, for a given color channel, the color in the captured image can be corrected by multiplying its albedo ratio for the given channel by 255.

19. A computer-readable medium having computer executable instructions for providing contents written on a whiteboard to remote meeting participants, said computer executable instructions comprising:
   obtaining geometric calibration data determining a geometric relationship between a whiteboard and a view of said whiteboard captured by a camera;
   obtaining color calibration data determining a color relationship between the color of writings written on the whiteboard and the color of writings written on a whiteboard and the color of the writings written on the whiteboard in an image captured by said camera;
   capturing an image of said whiteboard having projected content and writings written on the whiteboard;
   calculating a visual echo of the captured image by correcting the color and geometry of the captured image using the geometric calibration data and the color calibration data; and
   displaying the writings written on the whiteboard on another display.

20. A system for segmenting a clear image of a whiteboard work surface for remote collaboration comprising:
   a camera capturing one or more images of a whiteboard that includes one or more items projected on the whiteboard and writings written on the whiteboard; and
   a visual echo cancellation module for separating into two files the one or more items projected on the whiteboard and the writings written on the whiteboard, wherein the visual echo cancellation module comprises sub-modules for;
   obtaining geometric calibration data determining a geometric relationship between a whiteboard and a view of said whiteboard captured by a camera;
   obtaining color calibration data determining a color relationship between the color of writings written on the whiteboard and the color of the writings written on the whiteboard in an image captured by said camera;
   capturing an image of said whiteboard having projected content and writings written on the whiteboard;
   calculating a visual echo of the captured image by correcting the color and geometry of the captured image using the geometric calibration data and the color calibration data; and
   using a ratio of the albedo of the captured image to the albedo of the visual echo to identify writings on the whiteboard.

21. The system of claim 20 further comprising:
   a remote site with a display for displaying the one or more items projected on the whiteboard and writings written on the whiteboard; and
   a network for sending said the one or more items projected on the whiteboard and writings written on the whiteboard to said remote site.

22. The system on claim 20 wherein the writings written on the whiteboard and the one or more items projected on the whiteboard are sent to the remote site in two separate files.

23. The system of claim 21 wherein the remote site has the capability to send back annotations to the whiteboard to be displayed with the one or more items projected on the whiteboard.

24. The system of claim 20 wherein if the ratio of the albedo of the captured image to the albedo of the visual echo is less than 1, then a given pixel[x,y] belongs to the writings if and only if:
- 1-(albedo ratio for the sum of the red, green and blue color channels)/3 is greater than (the sum of the variances of the pixel for the red, green and blue color channels)/(the sum of the visual echoes for the pixel for the red, green and blue color channels).

25. The system of claim 24 wherein for a pixel [x,y] that belongs to the writings, for a given color channel, the color of the writings in the captured image is corrected by multiplying its albedo ratio for the given channel by 255.

26. The system of claim 25 wherein for a pixel [x,y] that belongs to the writings, for a given color channel, the color in the captured image can be corrected by:

choosing four classes of color corresponding to the most commonly used markers used to mark on the whiteboard;

recovering the set of writings;

correcting the color of the writings in the captured image for the red, green and blue color channels;

converting the color of the writings from red, green and blue color space to hue, saturation and intensity color space to create a new image;

manually defining writings corresponding to the four classes of color and histogramming these writings by hue, saturation and intensity; and evaluating the probability the each pixel in the new image belongs to one of the four classes based on the histogram.

* * * * *

UNITED STATES PATENT AND TRADEMARK OFFICE
CERTIFICATE OF CORRECTION

PATENT NO. : 7,496,229 B2  
APPLICATION NO. : 10/780209  
DATED : February 24, 2009  
INVENTOR(S) : Zhengyou Zhang et al.

Page 1 of 1

It is certified that error appears in the above-identified patent and that said Letters Patent is hereby corrected as shown below:

In column 14, line 40, in Claim 20, delete "for;" and insert -- for: --, therefor.

Signed and Sealed this
Tenth Day of May, 2011

David J. Kappos
*Director of the United States Patent and Trademark Office*